United States Patent [19]

Kaminstein

[11] 4,007,886
[45] Feb. 15, 1977

[54] LINE WINDER

[76] Inventor: Bernard Kaminstein, 329 Franklin Place, Paramus, N.J. 07652

[22] Filed: Aug. 8, 1975

[21] Appl. No.: 603,008

[52] U.S. Cl. .......................... 242/84.2 R; 242/106
[51] Int. Cl.² ...................................... A01K 89/00
[58] Field of Search ....... 242/54 R, 84.1 R, 84.2 R, 242/106, 104, 67.3 R, 68.4

[56] References Cited
UNITED STATES PATENTS

| 884,721 | 4/1908 | Davidson | 242/68.4 |
| 2,514,970 | 7/1950 | Prichett | 242/68.4 |
| 2,987,265 | 6/1961 | Quinones | 242/67.3 R |
| 3,011,735 | 12/1961 | Lachat | 242/104 X |
| 3,647,155 | 3/1972 | Jorgensen | 242/106 |
| 3,704,840 | 12/1972 | Haddock | 242/84.2 R |

*Primary Examiner*—Edward J. McCarthy
*Attorney, Agent, or Firm*—Lindenberg, Freilich, Wasserman, Rosen & Fernandez

[57] ABSTRACT

Apparatus for winding a fishing line or the like onto or off from a variety of fishing reels, including a pair of reel holders positioned on opposite sides of the reel with one of the holders being rotatably driven as by a motor. One of the reel holders includes a support face that bears against an end of the reel, an axial hole in the holder, a centering shaft with a tapered face slideably mounted in the hole, and a spring that urges the tapered face of the shaft towards the reel to enter a central hole in the reel and thereby center the reel on the axis of rotation of the reel holder. One of the reel holders is in the shape of a spool with a tapered line-receiving axle and with a removable spool end at the narrowest end of the axle, so that line wound onto the tapered axle can be easily removed. Reels with bases are held on a frame with a cam-operated clamping bracket.

11 Claims, 7 Drawing Figures

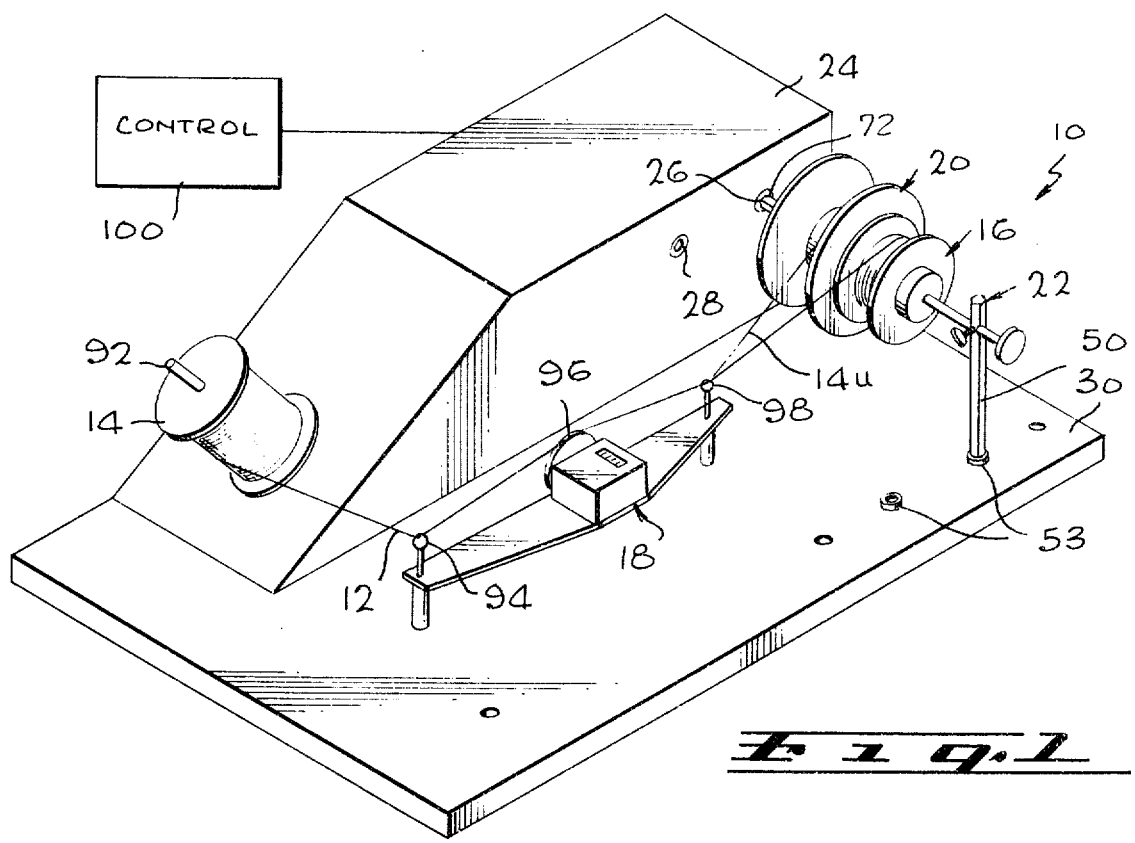
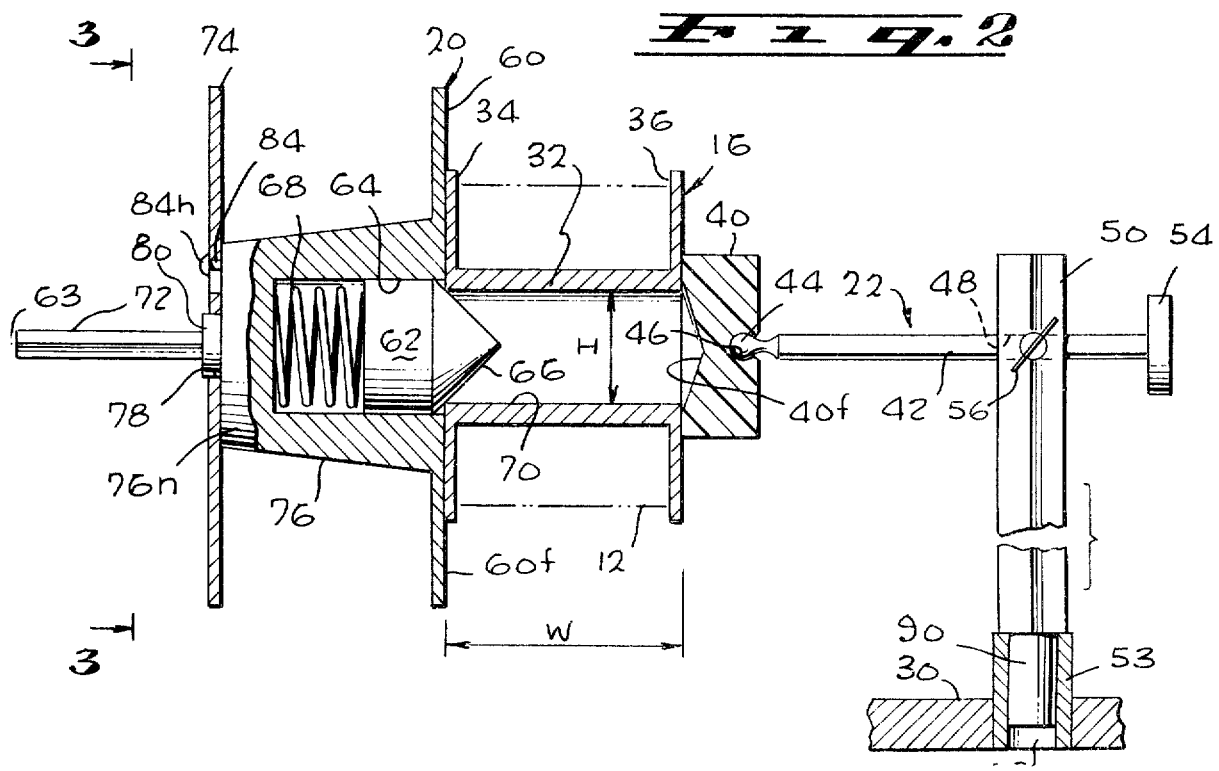

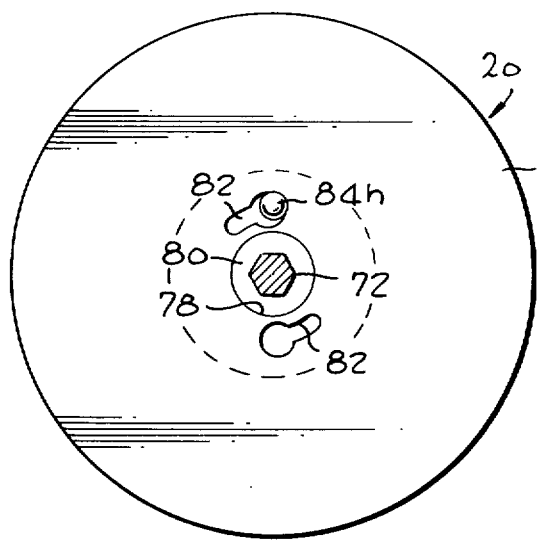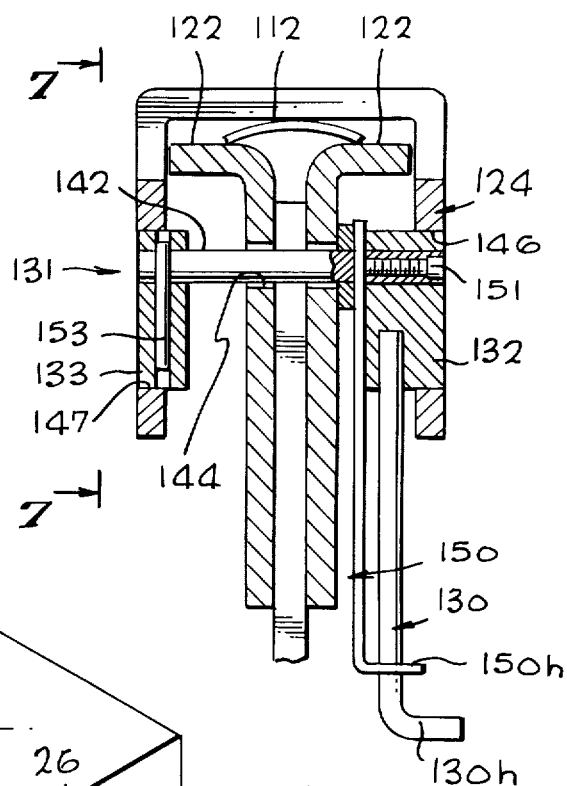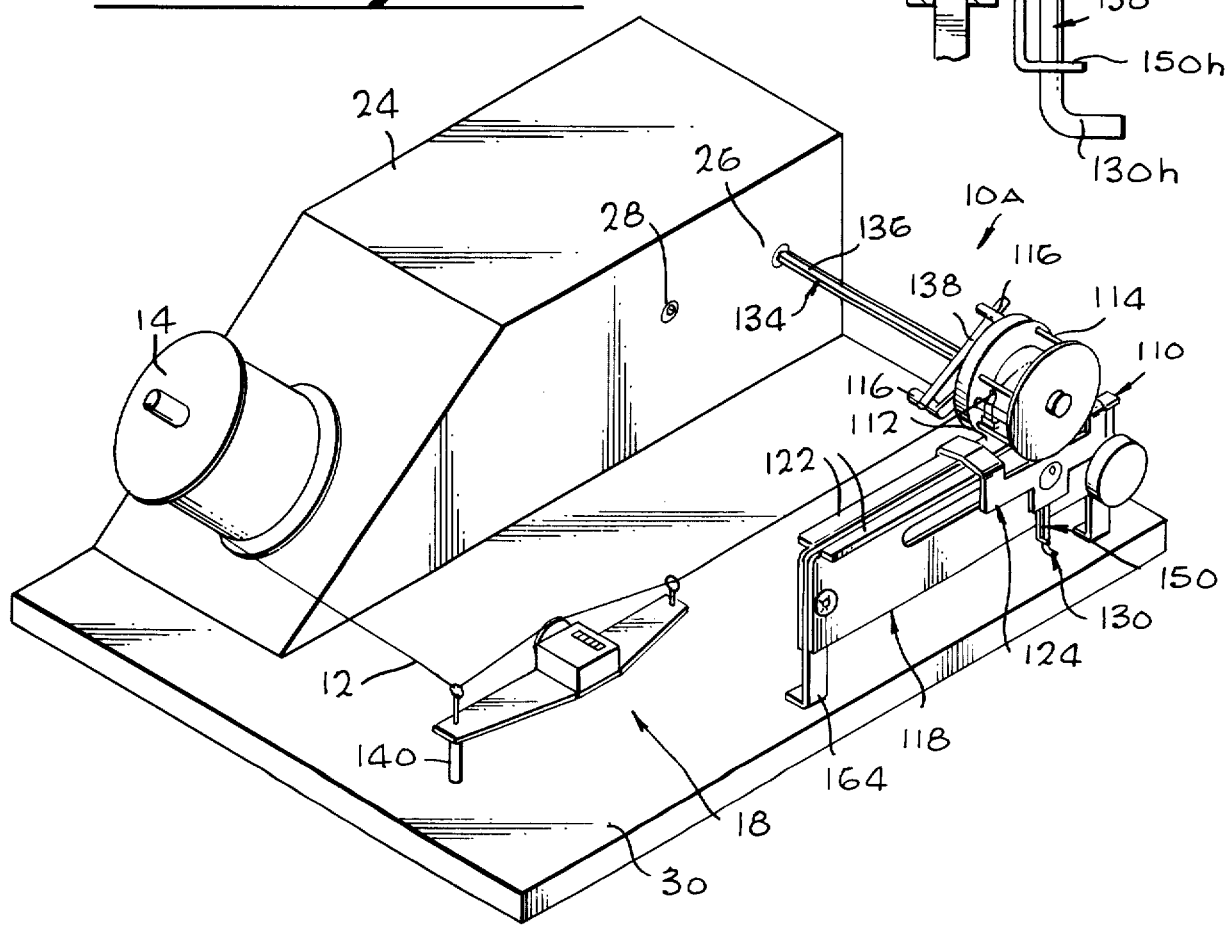

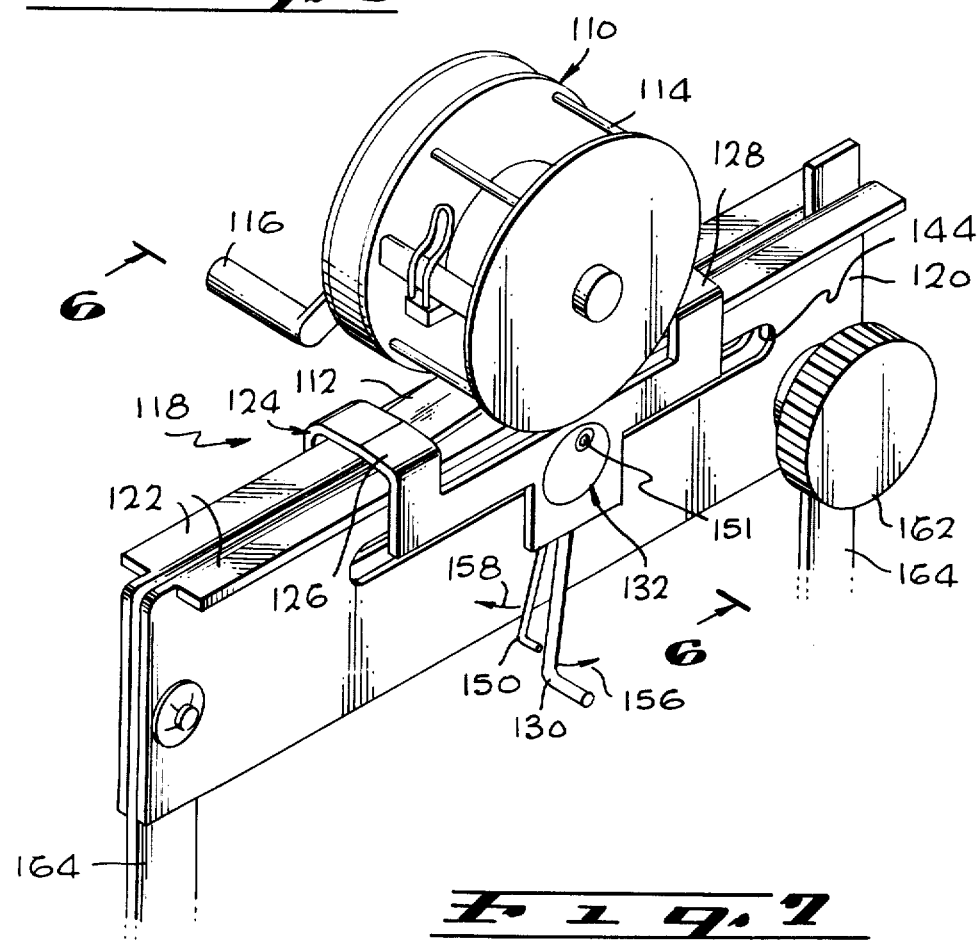
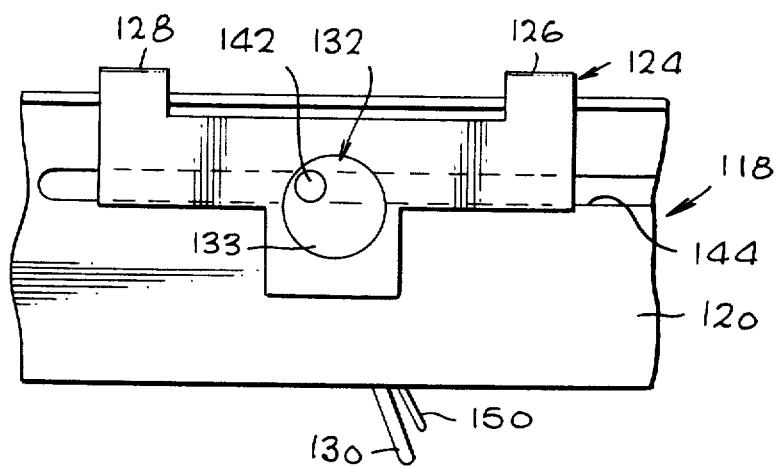

LINE WINDER

BACKGROUND OF THE INVENTION

It is difficult to provide a simple universal line winder for winding fishing line onto commonly encountered fishing reels, because of the variety of reels that are commonly encountered. One type of reel is in the shape of a simple spool, but the sizes of such reels vary and therefore it is difficult to provide a simple apparatus for rotatably supporting such a reel and turning it by an electric or hand-driven motor. Another common type of fishing reel includes a built-in handle connected through gears to the spool axle, and a built-in foot or mounting base for holding the reel to a fishing rod. A relatively simple apparatus that could accommodate a variety of types and sizes of commonly encountered reels would be of considerable value.

SUMMARY OF THE INVENTION

In accordance with one embodiment of the present invention, a line winder of relatively simple construction is provided, which can rotate a variety of different reels. For reels in the shape of spools but with different size axial holes, a pair of rotatable holders are provided to bear against opposite ends of the reel. A first of the holders includes a support face for bearing against the reel, an axial hole in the holder, a centering shaft with a tapered end slideably mounted in the hole of the holder, and a spring that urges the tapered end of the shaft into the axial hole of the reel to center the reel on the holder.

One of the holders is constructed as a spool for receiving line that is unwound from a fishing reel. This spool-like holder has a tapered axle and has a removable plate at the narrowest end of the axle. When a line has been wound onto the tapered axle, the plate is removed so that the wound line can be slipped off the axle.

A reel holder for reels that have a mounting base and built-in handles, includes a frame on which the reel base can lie, a bracket slideably mounted on the frame for fitting over opposite ends of the reel base, and a cam which slides along with the bracket to clamp it and the reel base thereunder against the frame. A T-bar is then utilized to couple a motor shaft to the handles of the reel to turn the reel.

The novel features of the invention are set forth with particularity in the appended claims. The invention will best be understood from the following description when read in conjunction with the accompanying drawings.

BRIEF DESCRIPTION OF THE DRAWINGS

FIG. 1 is a perspective view of the line winder, shown in a set up for winding line onto a simple baseless spool-type reel;

FIG. 2 is a sectional front elevation view of a portion of the apparatus of FIG. 1;

FIG. 3 is a view taken on the line 3—3 of FIG. 2;

FIG. 4 is a perspective view of the line winder of FIG. 1, shown with additional accessory portions thereof utilized for winding line onto a reel of the type which has a mounting base;

FIG. 5 is a perspective view of the reel holder of FIG. 4;

FIG. 6 is a partial sectional view of the holder of FIG. 5, taken on the line 6—6 thereof; and FIG. 7 is a view taken on the line 7—7 of FIG. 6.

DESCRIPTION OF THE PREFERRED EMBODIMENTS

FIG. 1 illustrates a line winder 10 which is being utilized to wind a fishing line 12 from a supply spool 14 onto a spinning reel 16, by way of a counter 18. The reel 16 is held by a pair of reel holders 20, 22 with rotatably mounted portions that capture the reel 16 between them. One of the holders 20 is rotatably driven by a motor assembly 24 which has a pair of drive sockets 26, 28 that rotate in opposite directions. The various parts of the winder are supported on a base 30 which has several holes in it to provide for changes in the positions of the reel holders and counter.

As also shown in FIG. 2, the spinning reel 16 is of a simple spool form, with a tubular reel axle 32 and a pair of flat ends 34, 36. Although many spools are of this general form, there is considerable variation in the sizes of the spools which complicates their rotational mounting; variations in overall width W and variations in axial hole diameter H lead to the greatest problems in mounting. The two reel holders 20, 22 are constructed to permit rapid rotational mounting of such reels.

The reel holder 22 includes a free spinning clamp or pressing member 40 with a concave face 40f that presses against one end of the reel 16 so that the reel is clamped between the member 40 and a corresponding member 60 of the other reel holder 20. The clamp member 40 is rotatably mounted on the end of a rod 42. This is accomplished by the reception of a ball 44 at the end of the rod, in a socket 46 of the clamp member 40, which permits the member 40 to rotate about an axis slightly out of line with the axis of the rod 42 to facilitate set up of the apparatus. The rod 42 extends through a hole 48 in a post 50 that is in turn received in a hole 52 of a member 53 that is mounted on the base 30. A rearward end of the rod 42 carries a handle 54 to facilitate sliding of the rod. A thumbscrew 56 is threadably received in the post 50, to permit the rod 42 to be secured at any position on the post. Thus, the sliding rod 42 can be adjusted in position to accommodate reels of various widths W.

The holder 20 has an end plate 60 which has a support face 60f that presses against one end 34 of the spinning reel opposite the clamp member 40, so that the reel is firmly clamped between the reel holders. In addition, the holder 20 includes a centering shaft 62 which can quickly center the axis of the reel 16 on the rotational axis 63 of the holder 20. The centering shaft 62 is slideably received in a hole 64 which is formed along the axis of the holder 20. The shaft 62 has a tapered or conical outer face 66 which faces the reel 16. A spring 68 within the holder 20 presses against the centering shaft to urge it outwardly so that the tapered face 66 enters the hole 70 formed along the axis of the spinning reel axle 32. The tapered face 66 of the centering shaft serves to center the reel 16 on the holder 20 so that their axes of inertia coincide, and therefore the reel rotates smoothly with the holder 20. The holder 20 has a hexagonal drive rod 72 which can be closely received in either of the drive sockets 26, 28 of the motor assembly, so that the drive rod is securely held and rotated to rotate the rest of the holder 20, the reel 16 pressed thereagainst, and the clamp member 40 of the other holder 22 that is pressed against the reel.

The holder 20 is in the form of a spool, with a pair of end plates 60, 74 and with a winding or line-receiving axle 76 extending between them. The outside of the axle 76 is tapered in diameter, with the narrowest end 76n lying adjacent to one of the end plates 74. The end plate 74 is constructed for rapid removal. As also shown in FIG. 3, the end plate 74 has a central hole 78 which is closely received on a flange 80 of the drive rod 72. The plate 74 has a pair of slots 82. A stud 84 which is fixed to the axle 76, extends through one of the slots 82 and has an enlarged head 84h that lies against the plate 74. The plate 74 can be removed by merely turning it so that the head 84h of the stud is aligned with an enlarged portion of a slot 82, and by then pulling off the end plate. The spool-shaped holder 20 is useful for receiving line to be unwound from a spinning reel. After the line has been wound on the axle 76, the plate 74 is removed and the coil of line can be merely slipped off the tapered axle 76 for discarding or use.

In order to set up the apparatus of FIG. 1 to wind line from a supply spool 14 onto a reel 16, a person first inserts the drive rod 72 of the holder 20 into one of the sockets such as 26 of the motor assembly. The other holder 22 is initially installed by placing the post 50 in one of the holes 52, and by loosening the set screw 56 and drawing back the rod 22 to provide room for receiving the reel 16. The reel 16 is then positioned between the holders, and the person then presses forward on the handle 54 at the end of the rod. As the rod 42 is pressed forward, the reel axle 32 presses against the face 66 of the centering shaft 62 to press the centering shaft against the spring force into the holder 20, until the reel end 34 firmly abuts the holder plate 60. The person then tightens the set screw 56 to hold the rod 42 in place. During such positioning, the rod 42 is positioned so that the center of the clamp member 40 lies on the axis of the reel 16. This may require slight lateral adjustment of the position of the clamp member 40. To permit for such adjustment, the post 50 is formed with a cylindrical lower end 90, and the hole 52 in the base 30 is circular and closely receives the circular post section 90. The clamp member 40 can easily rotate even if its axis of rotation is not precisely aligned with the axis of the rod 42 because of the ball and socket joint between them, as discussed above.

After the reel 16 has been properly installed between the holders 20, 22, the supply spool 14 can be rotatably mounted, as by slipping the supply spool on a spindle 92. The line 12 is then passed through a guide 94 of the counter apparatus, over a counter wheel 96, through another guide 98, and onto the reel 16. A foot switch and speed control 100 is then turned on to rotate the holders and reel.

When it is desired to unwind a line from a reel, the reel is rotatably mounted, as by installing it on the spindle 92 or in some other fixture and then attaching an end of the line to the spool-shaped holder 20, so that the line moves along the path portion 14u onto the holder 20. The other holder 22 can be utilized to prevent the holder 20 from falling out of a socket 26 or 28.

FIGS. 1–6 illustrate the line winder in a configuration 10A for winding line onto a spinning reel 110 of the type which has a slightly curved strip-shaped mounting base 112, cross bars 114 about the line-receiving axle, and handles 116 coupled by gears to the reel axle, all of which would prevent the reel from being held in the manner shown in FIGS. 1 and 2. In order to support the reel, another form of reel holder 118 is provided. The holder 118 includes a frame 120 with longitudinally-extending tracks 122 and with a bracket 124 which is longitudinally slideable to a variety of positions along the tracks and which is designed to clamp the base 112 of the reel against the frame at any of the positions. The reel is mounted on the holder by slipping the base 112 under a pair of longitudinally spaced legs 126, 128 of the bracket, and then operating a cam handle 130 which pivots a cam member or cam 132 to move down the bracket so that the legs 126, 128 thereof firmly clamp the ends of the reel base 112 against the tracks 122 of the frame. The handles 116 of the reel are coupled to a drive socket such as 26 of the motor assembly by a T-bar 134 which has a rod or shaft 136 received in the drive socket and a cross bar 138 engaged with the handles 116 of the reel. The same counter and guide apparatus 18 is utilized, although a post 140 of the counter apparatus is now installed in a different hole of the base 30. If it is desired to rotate the reel handles 116 in an opposite direction, the T-bar 134 is inserted in the other socket 28, and the bracket 124 is unclamped and shifted longitudinally along the frame to a position opposite the socket 28.

The cam 132 of the cam assembly 131, is of circular shape and is rotatably mounted on a shaft 142 off center from the axis of the shaft. The shaft 142 extends through slots 144 in the frame and is rotatably mounted on the bracket to move with it. The cam handle 130 is in the form of a rod with a bent handle end 130h and with an opposite end attached to the cam 132 to facilitate pivoting of the cam within a hole 146 in the bracket against which it bears.

In order to prevent loosening of the cam 132, the holder is provided with a locking handle 150 that can be operated to lock the cam in its bracket-clamping position. The locking handle 150 extends through a diametric hole in the shaft 142 and is fixed to the shaft 142 by means of a setscrew 151. Another cam 133 is fixed to the shaft 142 by a roll pin 153, the cam 133 lying closely within another hole 147 of the bracket 124. If the two handles 130, 150 are pivoted apart, as when handle 130 is pivoted in the direction of arrow 156 while handle 150 is pivoted in the direction of arrow 158, then the shaft 142 tends to become misaligned and jams on the cam 132, to lock it in position and thereby prevent it from turning.

When a person wishes to clamp a spinning reel base, he merely pivots down the lower end 130h of the cam handle in the direction of arrow 156. The locking handle 150 tends to move also until the base begins to be clamped and the handle 150 then tends to be left behind. As the cam handle 130 is pivoted further, it separates from locking handle 150, and therefore the cam 132 tends to be locked into its position wherein it clamps down the bracket. In order to release the spinning reel, the cam handle 130 is pivoted in the opposite direction as indicated by arrow 158. Unlocking is easily accomplished by a person squeezing together the handle portions 150h, 130h of the locking and cam handles. The bottom of the locking handle 150h is in the path of the cam handle 130, so that further pivoting of the cam handle in the direction of arrow 160 assures corresponding pivoting of the lock handle.

Thus, the bracket 124 can be longitudinally positioned to adjust the position of the spinning reel 110 so that it properly engages the T-bar 134. Slight up and down movement of the reel can also be accomplished by loosening the knob on a locking screw assembly 162 at one end of the frame 120, in order to permit up and down sliding of one end of the frame from one of the support posts 164 that mounts the frame on the base 30.

Thus, the invention provides a highly versatile and relatively simple line winder, which can hold and turn reels of a variety of types and sizes, and which can also be used for unwinding line from a reel. Reels of simple spool form, with a range of sizes of axial holes and spool widths, can be held by the use of a holder with a spring biased shaft that has a tapered face to enter the reel hole and center it. The holder is in the form of a spool with a tapered axle and removable end plate, which facilitates the unwinding of line from a reel. Another reel holder is provided for reels of the type that have a mounting base, to clamp the base at a variety of positions.

Although particular embodiments of the invention have been described and illustrated herein, it is recognized that modifications and variations may readily occur to those skilled in the art and consequently it is intended that the claims be interpreted to cover such modifications and equivalents.

What is claimed is:

1. A line winder for winding a line on a reel of the type which has an elongated strip-shaped reel base, a reel, and with a rotatable handle, comprising:
   a winder base;
   a reel holder mounted on said winder base, for holding the base of a reel; and
   motor means mounted on said base for rotating a reel which is on said holder;
   said reel holder including a frame with a longitudinally-extending portion, a bracket longitudinally positionable along said longitudinally-extending portion of said frame and having a pair of spaced legs for receiving the ends of a reel base between the legs and frame, and a cam assembly coupled to said frame and bracket for clamping said legs of said bracket and the ends of the reel base thereunder on said frame.

2. The line winder described in claim 1 including:
   a T-bar with a shaft coupled to said motor means and with a cross rod for engaging and turning the handle of said reel.

3. The line winder described in claim 1 wherein:
   said reel holder frame includes a longitudinally-extending slot, and said cam assembly includes a shaft extending through said slot, a first cam member rotatably mounted on said shaft off-center from the axis of the shaft and bearing against said bracket, a second cam member fixed to said shaft and bearing against said bracket, a cam handle attached to said cam member to pivot it, and a lock handle attached to said shaft to pivot it, so that when said lock handle is pivoted with respect to said first cam it jams said shaft to prevent free rotation of said cam member, whereby to prevent unintended turning of the cam member that would release the reel.

4. The line winder described in claim 3 wherein:
   said cam and lock handles extend close to one another, with said lock handle lying in the path of said cam handle when said cam handle is moved in a direction to unclamp said bracket, whereby upon movement of said cam handle to unclamp said bracket the lock handle is automatically pivoted to release said cam member for unhindered further pivoting.

5. A line winder for winding a line on a reel comprising:
   first and second holders for holding opposite sides of the reel;
   a first of said holders having a rotatable support member that includes a support face and an axial hole extending to its support face, a centering shaft with a tapered face and slideably mounted in said axial hole, and spring means for urging said centering shaft out of said support face of said rotatable member to center the reel on the axis of the holder member;
   said first holder being in the shape of a spool with a tapered axle portion for supporting turns of line thereon, and with a pair of end plates, one of said end plates which lies at the smallest end of said tapered axle portion being removable; and
   motor means coupled to said first holder to rotate it, whereby to permit the unwinding of line from a reel or the like onto said spool and to permit easy removal of the line from the spool.

6. A line winder for winding a line on a reel comprising:
   a base;
   a first holder for engaging a side of a reel;
   motor means mounted on said base and connected to said first holder to rotate it; and
   a second holder for engaging a side of a reel opposite the side engaged by said first holder, said second holder including a post-like member mounted on said base, a rod slideably mounted on said post, a screw mounted on said post to clamp said rod at a desired position thereon, and a pressing member rotatably mounted on an end of said rod to press against a reel;
   said first holder having a rotatable support member that includes a support face and an axial hole extending to its support face, a centering shaft with a tapered face and slideably mounted in said axial hole, and spring means for urging said centering shaft out of said support face of said rotatable member to center the reel on the axis of the holder member.

7. A line winder for winding a line on a fishing reel comprising:
   first and second holders for holding opposite sides of the reel;
   a first of said holders having a rotatable support member that includes a support face and an axial hole extending to its support face, a centering shaft with a tapered face and slideably mounted in said axial hole, and spring means for urging said centering shaft out of said support face of said rotatable member to center the reel on the axis of the holder member; and
   motor means for rotating at least one of said holders;
   said second holder including a rotatably-mounted pressing member with a reel-engaging face which is of larger diameter than said tapered face of said centering shaft, said reel-engaging face being non-convex so that its radially outer portion engages a fishing reel lying between said holders.

8. The line winder described in claim 7 wherein:
   said reel-engaging face of said pressing member is concave.

9. The line winder described in claim 7 including:
   a fishing reel (16) having a line-receiving tubular reel axle (32) and a pair of flange ends (34, 36), said flange ends having an outside diameter at least as large as the width (W) of said reel;

said reel being held between said first and second holders, with one flange end (34) lying against said support face (60) of said first holder and the other flange end (36) lying against said reel-engaging end of said pressing member.

10. A line winder for winding a line on a fishing reel comprising:

first and second holders for holding opposite sides of the reel;

a first of said holders having a rotatable support member that includes a support face and an axial hole extending to its support face, a centering shaft with a tapered face and slideably mounted in said axial hole, and spring means for urging said centering shaft out of said support face of said rotatable member to center the reel on the axis of the holder member; and motor means for rotating at least one of said holders;

said support face of said first holder being non-convex and having a diameter at least twice the diameter of said tapered face of said centering shaft, whereby to provide large area engagement with the face of a typical fishing reel to prevent wobbling of the reel and assure high friction engagement therewith.

11. The line winder described in claim 10 wherein:

said centering shaft is free to slide far enough along said axial hole that substantially the entire tapered face of said centering shaft can project beyond said support face of said holder, whereby to enable firm engagement of a wide size range of reels that have large flanges.

* * * * *